United States Patent [19]

Ogiwara

[11] 4,430,574
[45] Feb. 7, 1984

[54] METHOD FOR SWITCHING OPERATION OF WATER WHEEL OR PUMP WATER WHEEL

[75] Inventor: Kenzu Ogiwara, Hitachi, Japan
[73] Assignee: Hitachi, Ltd., Tokyo, Japan
[21] Appl. No.: 298,262
[22] Filed: Aug. 31, 1981

[30] Foreign Application Priority Data

Sep. 1, 1980 [JP] Japan ................... 55-119770

[51] Int. Cl.$^3$ .............................. F03B 3/10
[52] U.S. Cl. ......................... 290/52; 415/1; 415/500
[58] Field of Search ............... 415/1, 500; 290/52

[56] References Cited

U.S. PATENT DOCUMENTS

| | | | |
|---|---|---|---|
| 3,236,497 | 2/1966 | Wycliffe | 415/500 |
| 3,372,645 | 3/1968 | Willi | 415/500 |
| 4,292,533 | 9/1981 | Yokoyama et al. | 290/52 |

Primary Examiner—J. V. Truhe
Assistant Examiner—Shelley Wade
Attorney, Agent, or Firm—Thomas E. Beall, Jr.

[57] ABSTRACT

A method for switching the mode of operation of a water wheel or a pump water wheel is disclosed. Water in a runner chamber of the water wheel or the pump water wheel is pushed down below a runner by supplying compressed air to cause a runner to race. When the operation of the water wheel or the pump water wheel is switched from an idling or racing operation of the runner to a generation mode, the characteristics of the water wheel or the pump water wheel and/or a power system are monitored and the monitored characteristics are compared with predetermined values. Based on the compare result, the operation is switched to the generation mode with or without the disconnection of a motor generator coupled to the water wheel or the pump water wheel from the power system.

4 Claims, 5 Drawing Figures

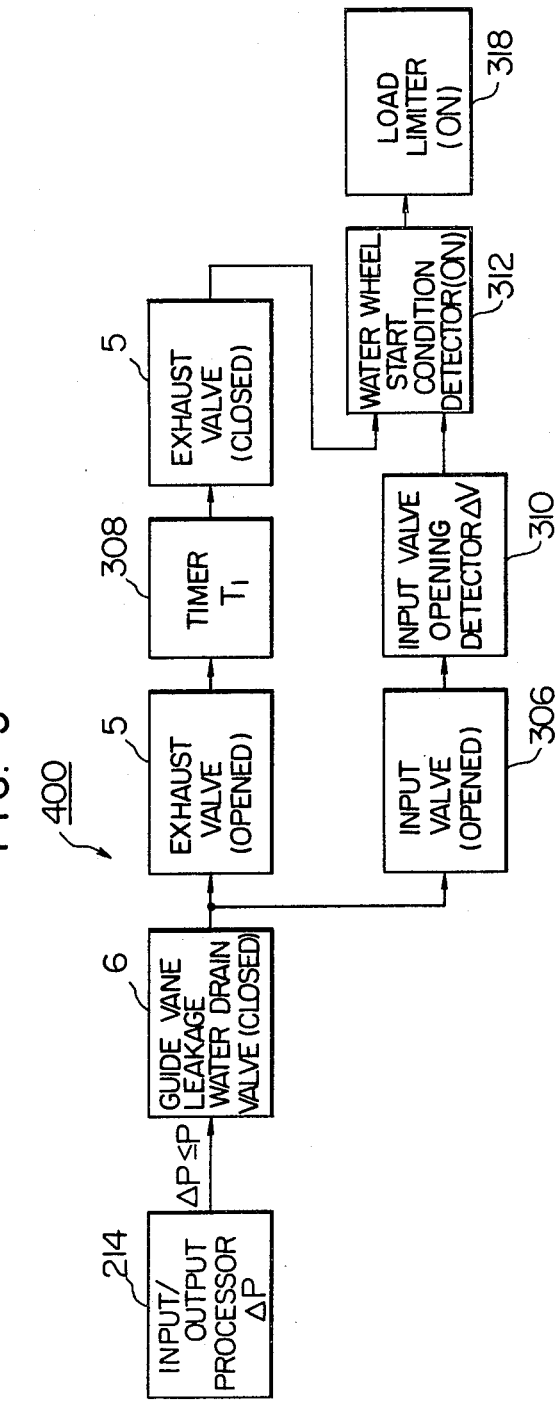

METHOD FOR SWITCHING OPERATION OF WATER WHEEL OR PUMP WATER WHEEL

The present invention relates to a method for operating a water wheel or pump water wheel, and more particularly to a method for switching the mode of the wheel from a racing operation to a generating operation.

In a hydraulic power plant, a motor-generator is not only used for generating electric power and for pumping up water but also frequently used as a synchronous phase modifier to improve the power-factor of a system. In the operation mode of synchronous phase modifier, the water level in a draft pipe is pushed down by compressed air to cause a runner to race so as to reduce a rotation loss of the runner. A water wheel generator is used to the load adjustment of a power system because its output is easily controlled only by controlling the opening of a guide vane of the water wheel or the pump water wheel thereof, unlike a steam turbine generator.

As the speed of a motor-generator has been increased and the size thereof has been reduced in recent years, however, when the operation is switched from the phase modification mode to the generation mode, a motoring input may increase because of a hydrodynamic characteristic of the water wheel so that the motor-generator may consume power as a motor. This power consumption may reach as much as two thirds of a capacity of the motor-generator. The switching from the phase modification mode to the generation mode is requested in the case where the power system requires power supply and such a power consumption by the motor-generator is very disadvantageous in operation of the system. In addition, the operation becomes unstable so as to cause vibrations and noises. This is not desirable in safe operation of a main machine.

As an approach to avoid the large power consumption in switching operation from the phase modification mode to the generation mode, it has been proposed to temporarily disconnect the main machine from the power system when the operation is switched from the phase modification mode to the generation mode (a rotation speed of the main machine being lowered in this case) to reduce the power consumption due to the input phenomenon due to the characteristic of the water wheel or the pump water wheel to zero, and open the guide vane before the rotation speed of the main machine has reached zero to increase the rotation speed of the main machine, and connect the main machine to the power system to bear a load. (See Japanese Patent Application Laid-open No. 146049/1978 which has been published as Publication No. 24103/1981.)

In this method, the large power consumption in the switching operation can be avoided but a long time is required before the main machine bears the load of power generation. As a result, when a sudden load requirement occurs in the system, the requirement cannot be rapidly met. In addition, since the main machine is disconnected independently of the characteristic of the water wheel or the pump water wheel at the time of switching operation, it may be disconnected even when the disconnection is not necessary from the standpoint of the characteristic of the water wheel or the pump water wheel. Accordingly, the response to the load requirement is delayed and the efficiency of the system operation is lowered.

It is an object of the present invention to provide a method for switching the mode of operation of a water wheel or a pump water wheel to enable a proper and rapid response to a load requirement of a power system.

The above object of the present invention is attained, when the water level in a runner chamber is pushed below a runner by supplying compressed air so that the operation of a water wheel or a pump water wheel is switched from a racing or idling condition of the runner to a power generating mode to bear a load, the characteristic of a water wheel or a pump water wheel and/or an output requirement of a power system is monitored and a motor-generator coupled to the water wheel or the pump water wheel is disconnected from the power system in accordance with the monitored characteristic.

According to the present invention, when the operation of the water wheel or the pump water wheel, which is apt to exhibit an overinput phenomenon due to the hydrodynamic characteristic thereof by its increased speed, is switched from the phase modification mode (idling or racing condition) mode to the generation mode, the disconnection is selectively effected in accordance with the monitored characteristic of the water wheel or the pump water wheel, so that the requirement of the power system may be more properly met and the switching operation may be effected in a short time, thereby improving the efficiency of the system operation.

The other objects, features and advantages of the present invention will be more apparent from the following description when read in conjunction with the accompanying drawings, in which:

FIG. 5 shows a control flow block diagram when the operation is switched to the generation mode without disconnecting the main machine from the power system in accordance with an embodiment of the present invention.

Figure 1:
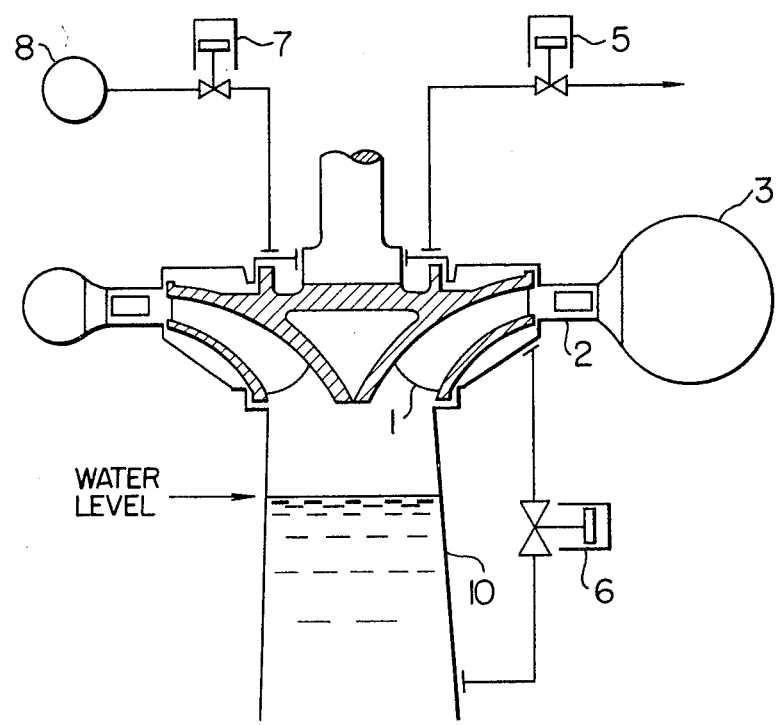
FIG. 1 shows a schematic diagram of a water wheel to which the present invention is applied.
Figure 2:
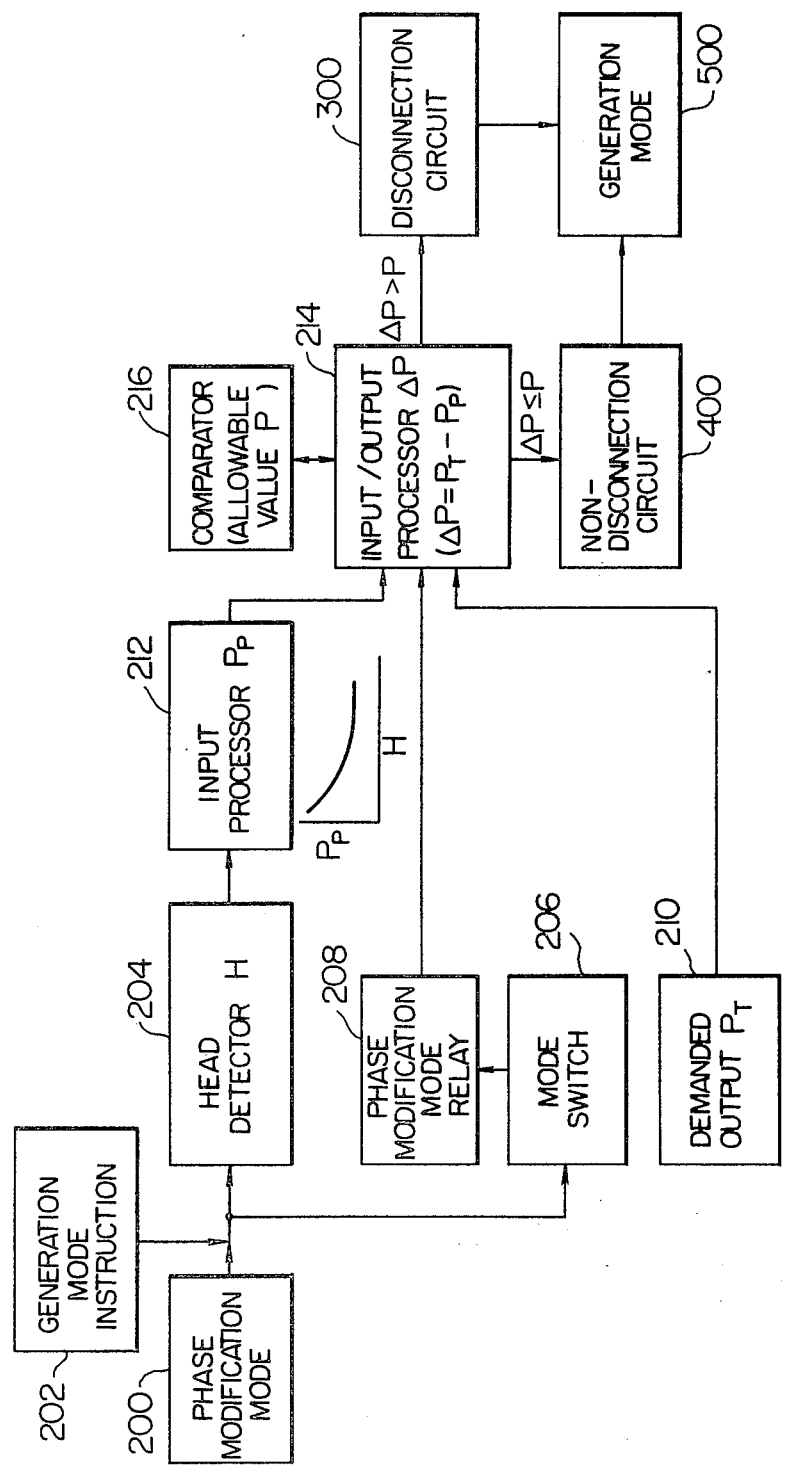
FIG. 2 shows a control flow block diagram illustrating mode switching operation steps from a phase modification mode to a generation mode in accordance with an embodiment of the present invention.

Referring to FIGS. 1 and 2, in a phase modification mode, the water level is pushed down by compressed air supplied into a draft pipe 10 from an air tank 8 through an air supply value 7 so as to cause a runner 1 to race. A guide vane leakage water drain valve 6 is opened to drain leakage water from a guide vane 2 into the draft pipe 10 to reduce an idling or racing torque of the runner 1. An exhaust valve 5 functions to exhaust air within the runner 1 so that the runner 1 is filled with water when the operation is switched from the phase modification mode to the generation mode.

Referring to FIG. 2, if a switching instruction 202 to the generating mode is issued when the system is in a phase modification (idling or racing) mode 200, the signal is applied to a phase modification mode relay 208 through a mode switching device 206. An output signal from the phase modification mode relay 208 is applied to an input/output processor 214.

On the other hand, the generation mode instruction signal 202 is also applied to a head detector 204 which detects a current head H (which is usually a pressure difference between an upper pond of a generating station, not shown, and a lower pond, also not shown). A signal indicative of the detected head is applied to an input processor 212 which determines an input amount $P_p$ corresponding to the head H.

The input amount $P_p$ indicative of the head H is applied to the input/output processor 214. On the other hand, a demanded output $P_T$ of the power system is also applied to the input/output processor 214 which calculates a difference between the demanded output $P_T$ of the power system and the input amount $P_p$, or $\Delta P = P_T - P_p$. The input/output processor 214 is provided with a comparator 216. When the difference $\Delta P$ between the input and the output exceeds an allowable value P of the power system, a signal is applied to a disconnection circuit 300 to disconnect the motor-generator from the power system and switch the operation to a generation mode 500. If the difference $\Delta P$ is not greater than the allowable value P, a signal is applied to a non-disconnection circuit 400 so that the operation is switched to the generation mode 500 without disconnecting the motor-generator from the power system.

Figure 3:
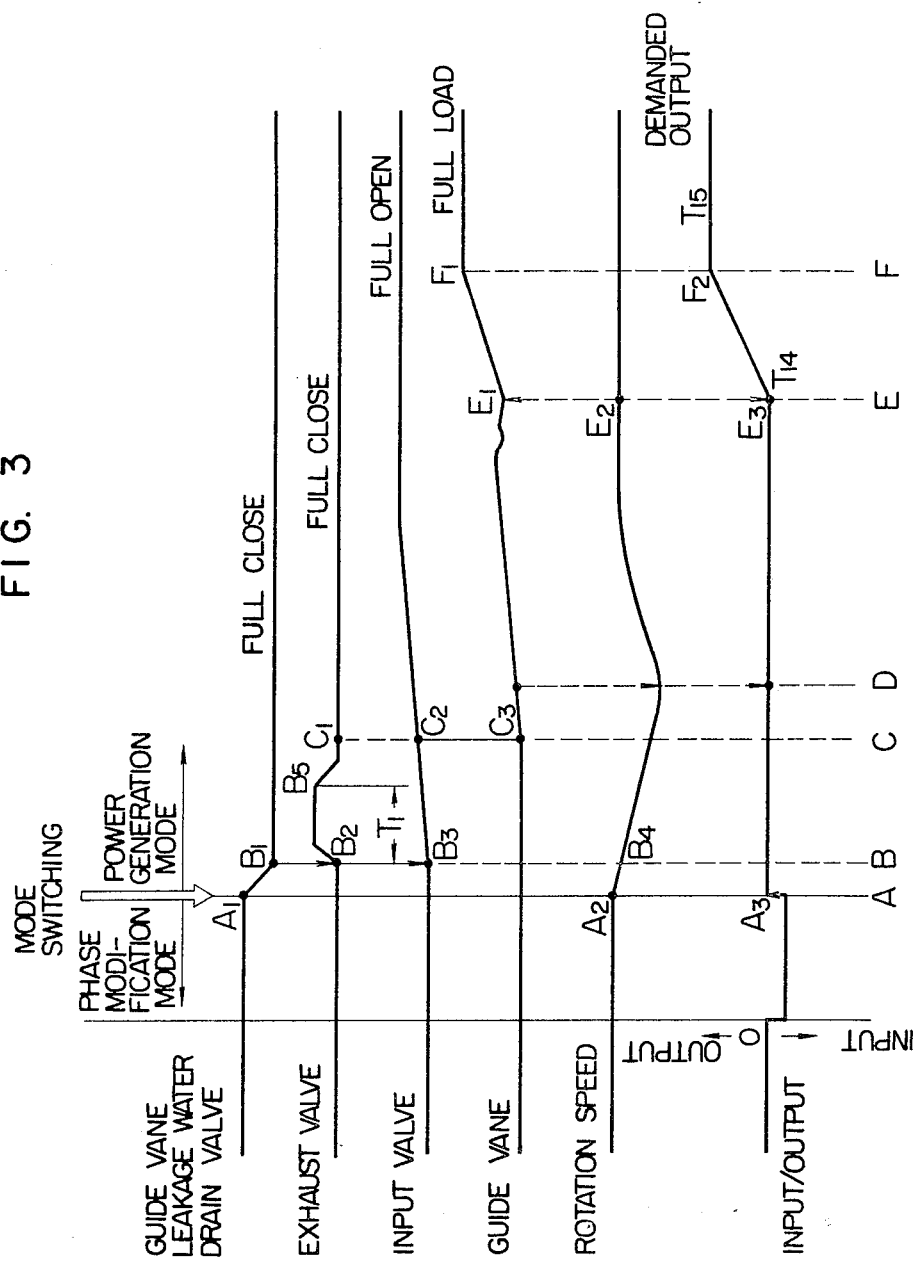
FIG. 3 shows a sequence diagram when a main machine is disconnected from a power system to switch the operation to the generation mode in accordance with an embodiment of the present invention.
Figure 4:
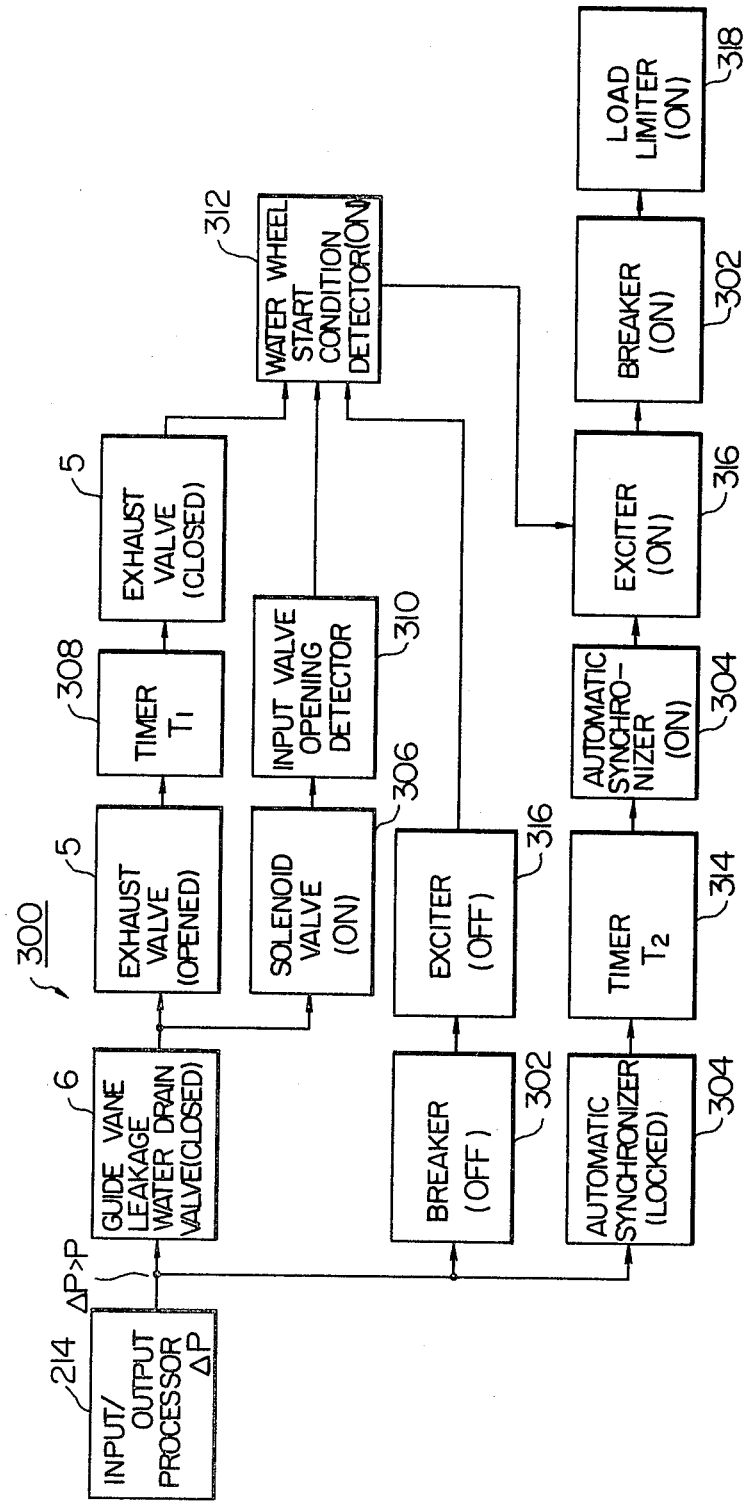
FIG. 4 shows a control flow block diagram for illustrating the sequence diagram of FIG. 3.

Referring to FIGS. 3 and 4, a specific example of switching the operation while disconnecting the motor-generator from the power system (for example, when the demanded output $P_T$ of the power system is 100 MW, the allowable value P is 200 MW, the head H is low and the input $P_p$ is $-150$ MW so that $\Delta P = P_T - P_P = 100$ MW$+150$ MW$=250$ MW$>P=200$ MW).

When the input/output processor 214 detects that the difference $\Delta P$ between the input and the output exceeds the allowable value P of the power system, the detection signal is applied to a breaker 302 of the disconnection circuit 300. As a result, the breaker 302 is turned off the disconnect the motor-generator from the power system so that the input in the phase modification mode is caused to be zero (A$_3$) and thereby rendering the power consumption zero. At the same time, the guide vane leakage water drain value 6 shown in FIG. 1 is closed (A$_1$) and an automatic synchronizer 304 is locked. Upon the complete closure of the guide vane leakage water drain valve 6, fully closed (B$_1$), a solenoid valve 306 is actuated to produce an instruction to open an input valve (not shown) (B$_3$) and the exhaust valve 5 is opened (B$_2$) so that air in the draft pipe 10 and the runner 1 is exhausted. As a result, the water wheel is rotated in the water and the rotation speed of the water wheel is reduced gradually by a rotation loss of the runner 1 (B$_4$). The full open time period T$_1$ of the exhaust valve 5 is detected by a timer 308 which accumulates elapsed time from the opening (B$_2$) of the exhaust valve 5. After the predetermined time period T$_1$, the exhaust valve 5 is closed (B$_5$).

In this period T$_1$, the input valve (not shown) is opened to a predetermined opening $\Delta V$ to allow the guide vane 2 to be opened by the solenoid valve 306 (C$_2$). The opening $\Delta V$ is detected by an input valve opening detector 310. On the condition that the exhaust valve 5 is closed (C$_1$) and the opening of the input valve is $\Delta V$, a water wheel start condition detector 312 is turned on. Upon the turning-on of the water wheel start condition detector 312, the guide vane 2 is opened (C$_3$).

On the other hand, a timer 314 accumulates elapsed time from the lock of the automatic synchronizer 304, and when a predetermined time interval T$_2$ has been detected by the timer 314 the automatic synchronizer 304 is turned on. As a result, the opening of the guide vane is so adjusted that the rotation speed of the main machine is increased from a minimum rotation speed (D) to near a synchronous speed with the power system (E$_1$). When the voltage, the rotation speed and the phase substantially match the power system (E$_2$), an exciter 316 is turned on and a breaker 302 is closed (E$_2$) to parallel the power system. This time point is called a non-load point (E$_3$). After the breaker has been closed, the guide vane 2 is opened (F$_1$) by a load limiter 318 until the demanded output (F$_2$) of the power system is reached, when the operation is switched to the generation mode 500.

On the other hand, when the difference $\Delta P$ between the input and the output does not exceed the allowable value P of the power system, the operation is switched without disconnecting the water wheel from the power system. The operation in this case is shown in FIG. 5 which is similar to the operation described above except the following point. The on-off operations of the breaker 302, the exciter 316 and the automatic synchronizer are not necessary and the water wheel start condition detector 312 is turned on under the condition that the exhaust valve 5 is closed and the opening of the input valve is $\Delta V$. The guide vane 2 is thus opened and the operation is switched to the generation mode. Accordingly, the demanded output of the power system is reached in a shorter time than when the water wheel is disconnected from the power system.

In the illustrated embodiment, the condition of the disconnection is determined by the relationship between the difference $\Delta P$ between the input amount $P_P$ indicative of the head H and the demanded output $P_T$ of the power system, and the allowable value P of the power system. The present invention is not limited to the above embodiment but the condition may be determined only by the head H or only by the difference $\Delta P$ between the input amount and the demanded output.

In the pump water wheel, the amount of input when the operation is switched from the phase modification mode to the generation mode is large when the head is low and small when the head is high. This trend can be predicted by a model test. Accordingly, when the input amount allowable to the operation of the system is fixed to a constant independently of the demanded output of the system, the control may be effected such that the operation is switched without disconnecting the main machine from the power system if the head is such that the input is below the allowable value, and the main machine is disconnected if the head is such that the input exceeds the allowable value.

Furthermore, since the input amount over an entire operation range is predictable, the control may be effected such that the main machine is not disconnected if the demanded output of the power system exceeds a predetermined value irrespective of the head and the main machine is disconnected if the demanded output is below the predetermined value. This method is effective in the case where the variation of the head is small, namely in the case where the variation of the input is small.

What is claimed is:

1. A method for switching an operation of a water wheel or a pump water wheel that is coupled to a motor-generator connected to a power system from its spinning-in-air mode into its power generating mode with supplying compressed air into a water wheel chamber to force down the level of water charged in the chamber below the water wheel runner, said method comprising the steps of:

monitoring the head of the water wheel or the pump water wheel and producing an output representing the monitored head;

comparing the output with a predetermined reference; and switching to the generation mode without disconnecting said motor-generator from said power system when the monitored head is such that an input amount is below an allowable value of said power system, and switching to the generation mode with said motor-generator disconnected from said power system when the head is such that the input amount exceeds the allowable value.

2. A method for switching an operation of a water wheel or a pump water wheel that is coupled to a motor-generator connected to a power system from its spinning-in-air mode into its power generating mode with supplying compressed air into a water wheel chamber to force down the level of water wheel charged in the chamber below the water wheel runner, said method comprising the steps of:

monitoring the demanded output of said power system and producing an output representing the monitored demanded output;

comparing the output with a predetermined reference; and switching to the generation mode without disconnecting said motor-generator from said power system when a demanded output of said power system exceeds a predetermined value, and switching to the generation mode with said motor-generator disconnected from said power system when the demanded output is below the predetermined value.

3. A method for switching an operation of a water wheel or a pump water wheel that is coupled to a motor-generator connected to a power system from its spinning-in-air mode into its power generating mode with supplying compressed air into a water wheel chamber to force down the level of water charged into the chamber below the water wheel runner, said method comprising the steps of:

monitoring both the head of the water wheel or the pump water wheel and the demanded output of said power system and producing corresponding outputs representing the monitored head and the monitored demanded output;

comparing said monitored head output with said demanded output of said power system; and switching to the generation mode with said motor-generator disconnected from said power system when the compared result exceeds an allowable valve of said power system and switching to the generation mode without disconnecting said motor-generator when the compared result does not exceed the allowable value.

4. The method according to claim 1, 2 or 3, wherein when the switching to the generation mode is effected under the condition that said motor-generator is disconnected from said power system, a breaker is opened, an exhaust valve for exhausting the compressed air is opened to exhaust the compressed air, an input valve is simultaneously commenced to open, said exhaust valve is fully closed after the lapse of a predetermined time interval from the time when it has been opened, a guide vane is opened when an opening of said input valve reaches a predetermined value, and said breaker is closed when a rotation speed of said motor-generator reaches a predetermined value.

* * * * *